(12) United States Patent
Fatt et al.

(10) Patent No.: US 8,973,827 B2
(45) Date of Patent: Mar. 10, 2015

(54) ADAPTER SYSTEM FOR A PORTABLE ELECTRONIC DEVICE (75) Inventors: Gregory Cheong Seng Fatt, Singapore (SG); Toh Boon Kiat, Sinagpore (SG); Lim Joo Hong, Sinagapore (SG)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/353,506

(22) Filed: Jan. 19, 2012

(65) Prior Publication Data
US 2012/0132715 A1 May 31, 2012

(51) Int. Cl.
| G06K 9/22 | (2006.01) |
| G06K 7/10 | (2006.01) |
| G06F 1/16 | (2006.01) |
| G06K 7/00 | (2006.01) |
| H04M 1/725 | (2006.01) |
| H04M 1/2755 | (2006.01) |

(52) U.S. Cl.
CPC .......... *G06K 7/10722* (2013.01); *G06F 1/1632* (2013.01); *G06K 7/0013* (2013.01); *G06K 7/006* (2013.01); *G06K 7/10009* (2013.01); *H04M 1/72527* (2013.01); *G06F 1/1626* (2013.01); *H04M 1/2755* (2013.01)
USPC ................................. 235/462.45; 235/472.01

(58) Field of Classification Search
USPC .............. 235/462.41, 462.45, 462.47, 472.01
See application file for complete search history.

(56) References Cited

U.S. PATENT DOCUMENTS

| 6,188,917 B1 | 2/2001 | Laureanti |
| 6,708,887 B1 | 3/2004 | Garrett et al. |
| 2005/0087603 A1 | 4/2005 | Koenck et al. |

FOREIGN PATENT DOCUMENTS

WO 2004017613 A1 2/2004

OTHER PUBLICATIONS

International Search Report and Written Opinion for counterpart International Patent Application No. PCT/US2010/042986 mailed on Nov. 4, 2010.
International Preliminary Report on Patentability and Written Opinion for counterpart International Patent Application No. PCT/US2010/042986 mailed on Feb. 2, 2012.

*Primary Examiner* — Daniel Hess
(74) *Attorney, Agent, or Firm* — Michael J. Giannetta; Randi L. Karpinia (57) ABSTRACT

An adapter system including an adapter unit is described herein. The adapter unit includes receptacles shaped for removably receiving at least a portion of a portable electronic device therewithin. The adapter unit further includes at least one of an image capture device and a data capture device controllable by operating at least one user interface of the portable electronic device.

17 Claims, 6 Drawing Sheets

ADAPTER SYSTEM FOR A PORTABLE ELECTRONIC DEVICE

TECHNICAL FIELD

The present invention relates generally to an adapter system for use with a portable electronic device.

BACKGROUND

The widespread use of portable electronic devices (PEDs), for example personal digital assistants (PDAs) and smartphones have led to many accessories being developed for use therewith. These accessories include commercial devices, for example barcode scanners, being made available to extend the capabilities of the PEDs. However, such commercial devices require the PEDs to be designed for physical accommodation thereof which in turn result in the commercial devices being size-restricted or the PEDs being enlarged. Commercial devices with such restrictions are coupled to the PED using a cable which renders the connection between the PED and the commercial device flimsy for use in an industrial setting. Furthermore, typically available commercial devices for use with the PEDs have limited functionality. For commercial devices that are developed for integration as adapters with purpose PEDs, the handling dexterity and ergonomic efficacy are low.

Alternatively, purpose-built industrial devices, for example hand-held barcode scanners, have built in telecommunication functionality. However, these devices typically have limited functional expansion capabilities and cumbersome in size. Therefore, there exists a need for an improved adapter system for use with PEDs.

SUMMARY

In accordance with a first aspect of the invention, there is disclosed an adapter unit comprising an adapter portion and a grip portion. The adapter portion is shaped for removably coupling with a portable electronic device and the adapter further for electrically communicating with the adapter portion when coupled therewith. The grip portion is formed adjacent the adapter portion and shaped for enabling one hand grip thereof by a user. The adapter unit further comprises at least one input actuator operable for communicating input signals with the portable electronic device via the adapter portion. The at least one input actuator and the grip portion being inter-configured to enable gripping of the grip portion and operation of the at least one input actuator with one hand and the input signals for at least one of providing data to and controlling the portable electronic device.

In accordance with a second aspect of the invention, there is disclosed an adapter system comprising a first adapter system which comprises a first adapter portion and at least one input actuator. The first adapter portion is shaped for removably coupling with a portable electronic device and the at least one input actuator is operable for communicating input signals with the portable electronic device via the first adapter portion. The adapter system further comprises a second adapter unit wherewith the input signals from the at least one input actuator is further communicable. The second adapter unit comprises a second adapter portion shaped for removably coupling with the portable electronic device. The first adapter portion and the second adapter portion further being inter-couplable for encasing the portable electronic device at least along the periphery thereof. The second adapter unit further comprises at least one of an image capture device and a data capture device controllable by operating the at least one input actuator for generating data signals providable to the portable electronic device.

In accordance with a third aspect of the invention, there is disclosed an adapter unit comprising an adapter portion an adapter portion shaped for removably coupling with and receiving at least a portion of a portable electronic device therewithin. The portable electronic device has at least one user interface. The adapter unit further comprises at least one of an image capture device and a data capture device controllable by operating the at least one user interface of the portable electronic device. The at least one of an image capture device and a data capture device being in data communication with the portable electronic device when coupled therewith.

DETAILED DESCRIPTION

A first exemplary embodiment of the present invention, an adapter system 20, is described hereinafter with reference to FIGS. 1 to 10. The adapter system 20 is for use with a portable electronic device (PED) 22. The PED 22 is, for example, a personal digital assistant (PDA), a smart phone, a hand-held barcode scanner, a GSM enabled hand-held scanner or the like devices.

Figure 1:
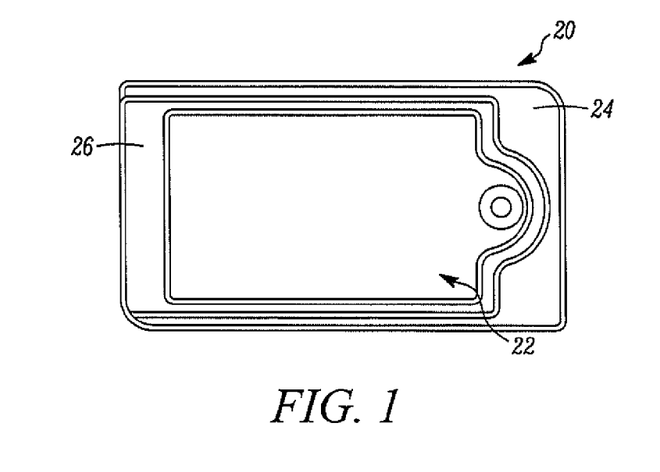
FIG. 1 shows a plan view of an adapter system, according to an exemplary embodiment of the invention, having a data capture device and with a first adapter unit and a second adapter unit being coupled with a portable electronic device (PED)
Figure 2:
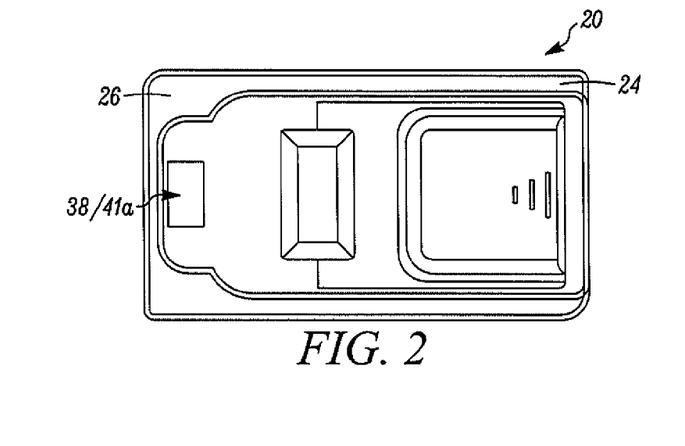
FIG. 2 shows a bottom view of the adapter of FIG. 1 with the data capture device being a barcode scanner.
Figure 3:
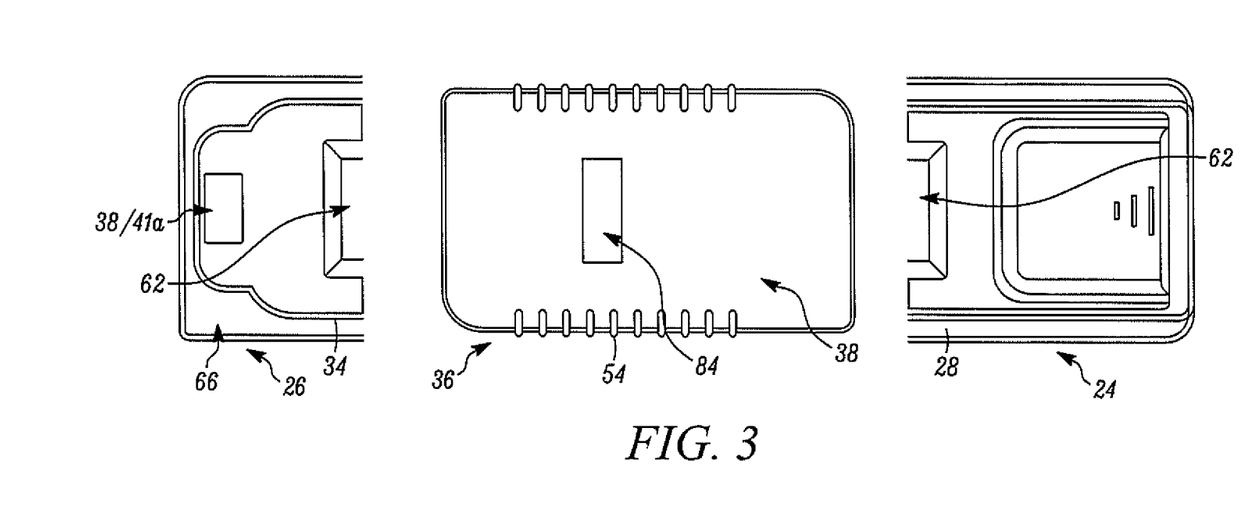
FIG. 3 shows a bottom view of the adapter system of FIG. 1 with the first adapter unit and the second adapter unit being decoupled from the PED.
Figure 4:
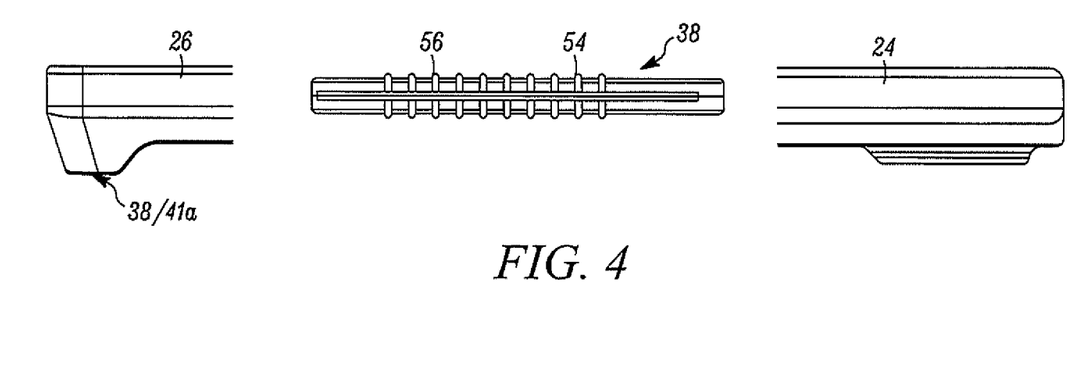
FIG. 4 shows a front elevation of the of the adapter system of FIG. 3.
Figure 5:
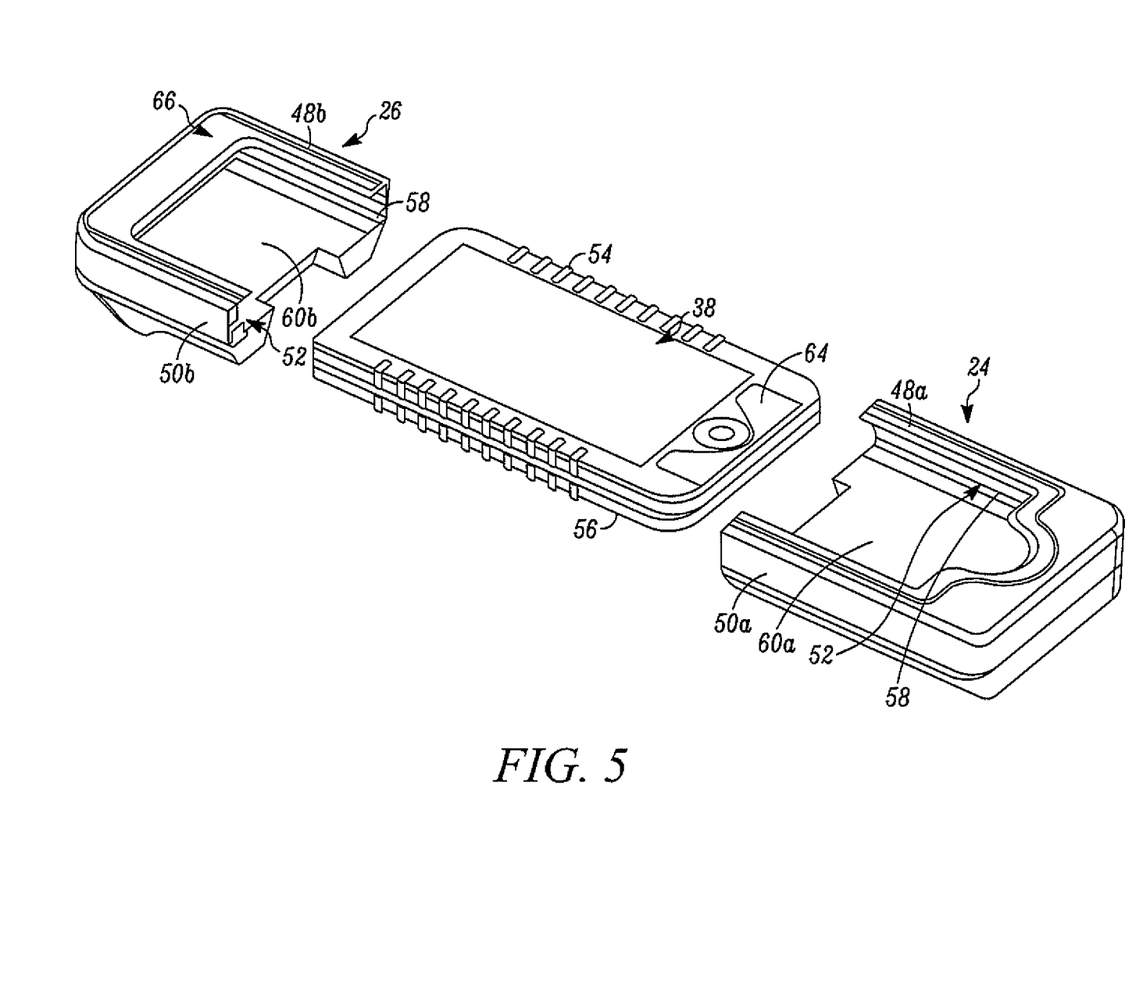
FIG. 5 shows an isometric view of the adapter system of FIG. 3.

The adapter system 20 comprises a first adapter unit 24 and a second adapter unit 26. The first adapter unit 24 comprises a first adapter portion 28 shaped for removably coupling with the PED 22 and at least one input actuator 30 operable for communicating input signals with the PED 22 via the first adapter portion 28. Preferably, the input signals are further communicable with the second adapter unit 26. Preferably, the second adapter unit 26 comprises a second adapter portion 34 shaped for removably coupling with the PED 22. The first adapter portion 28 and the second adapter portion 34 further being inter-couplable for encasing the PED 22 at least along the periphery 36 thereof.

Figure 6:
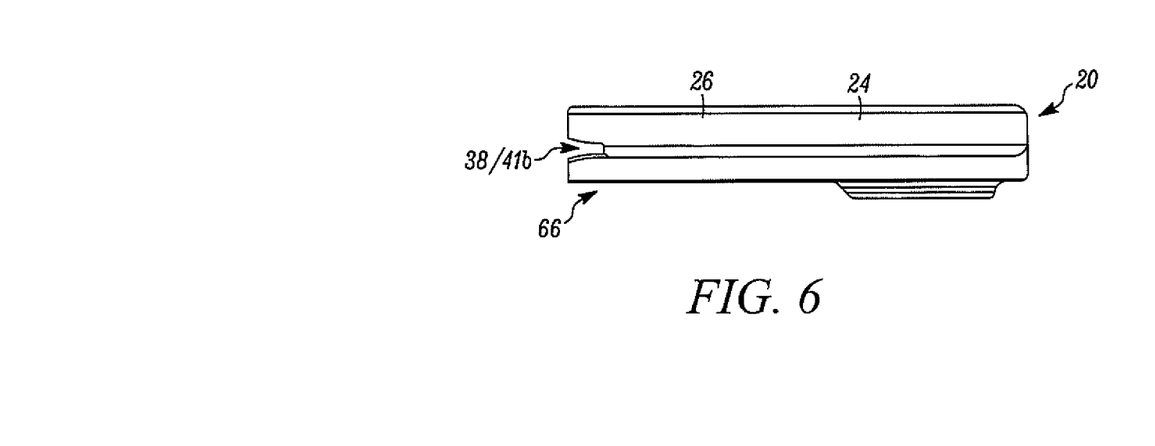
FIG. 6 shows a front elevation of the adapter system of FIG. 1 with the data capture device being a card reader.
Figure 7:
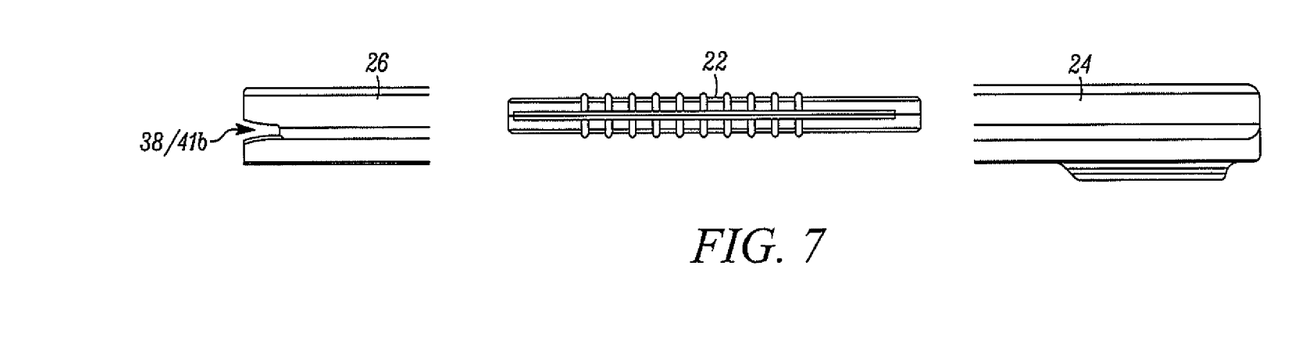
FIG. 7 shows a front elevation of the adapter system of FIG. 6 with the first adapter unit and the second adapter unit being decoupled from the PED.

Preferably, the second adapter unit 26 comprises a data capture device 38 controllable by operating the at least one input actuator 30. When operated, the data capture device 38 generates data signals providable to the PED 22. Preferably, the data capture device 38 comprises a barcode scanner 41a for generating the data signals from scanning of a barcode (not shown). Alternatively, the data capture device 38 comprises a card reader 41b shaped for receiving a portion of a card therewithin, for example a smartcard, or for swiping of a data carrying card, for example a card with a data-carrying magnetic strip, therethrough as shown in FIGS. 6 and 7. Further alternatively, the data capture device 38 is a near-field transceiver (not shown) for capturing data from an active transponder or a passive transponder, for example, by back scattering techniques. Further alternatively, the data capture device 38 can contain one or a combination of the barcode scanner 41a, the card reader 41b and the near field transceiver. Alternative or in addition to the data capture device 38, the second adapter unit 26 comprises an image capture device (not shown).

Each of the first adapter portion 28 and the second adapter portion 34 comprises a receptacle shaped for receiving a portion of the PED 22 therewithin. Each of the first adapter portion 28 and the second adapter portion 34 further comprises a plurality of adapter contacts for engaging and electrically communicating with corresponding plurality of device contacts of the PED 48.

The receptacle of each of the first adapter portion 28 and the second adapter portion 34 comprises a first arm 48a/48b and a second arm 50a/50b spatially disposed from the first arm 48a/48b. Each of the first arm 48a/48b and the second arm 50a/50b defining a trench 52 therealong. The trench 52 of one of the first arm 48a/48b and the second arm 50a/50b inwardly opposing the trench 52 of the other thereof.

The PED 22 is preferably rectilinearly-shaped with ribs 54 formed along two opposite sides of the periphery of the PED 22. Preferably, the ribs 54 are for enabling better grip of the PED 22 by a user. Preferably, the ribs 54 are rounded to enable accommodation thereof within the trench 52 of each of the first arm 48a/48b and the second arm 50a/50b when the PED 22 slides into the receptacle of the first adapter portion 28 for coupling therewith and into the receptacle of the second adapter portion 34 for coupling therewith.

A groove 56 is defined on the two opposing sides of the PED 22 along the length thereof. The groove 56 cuts through the ribs 54. Rails 58 extends along and from within the trench 52 of each of the first arm 48a/48b and the second arm 50a/50b for mating with the grooves of the PED 22 and functioning as a guide for sliding of the first adapter portion 28 and the second adapter portion 34 relative thereto.

Each of the first adapter portion 28 and the second adapter portion 34 further comprises a backing structure 60a/60b extending between the first arm 48a/48b and the second arm 50a/50b. The backing structure 60a/60b extends over a face of the PED 22 when the first adapter unit 24 and the second adapter unit 26 couples therewith. The backing structure 60a/60b defines at least one opening 62 for exposing and enabling access to at least one portion of the face of the PED 22. Preferably, the PED 22 comprises a plurality of user interfaces 64. The plurality of user interfaces 64 of the PED 22 comprises one or more of buttons, a scroll-wheel, a display, a touch-screen and a joy-stick. The at least one opening 62 defined by the backing structure 60a/60b enables the plurality of user interfaces 64 to be accessed by a user.

Each of the first adapter unit 24 and the second adapter unit 26 further comprises catches (not shown) or the like fastening means for releasably securing the PED 22 to each thereof. Additionally or alternatively, the catches further inter-couple the first adapter unit 24 and the second adapter unit 26.

The second adapter unit 26 further comprises an end portion 66 wherefrom the first arm 48b and the second arm 50b extends. Preferably, the data capture device 38 of the second adapter unit 26 is formed on the end portion 66. Alternatively, the data capture device 38 of the second adapter unit 26 is formed on the backing structure 60b thereof. Additional user interfaces (not shown) are formable on the end portion 66 to enable control of, for example, the data capture device 38 or the PED 22 therevia.

Figure 8:
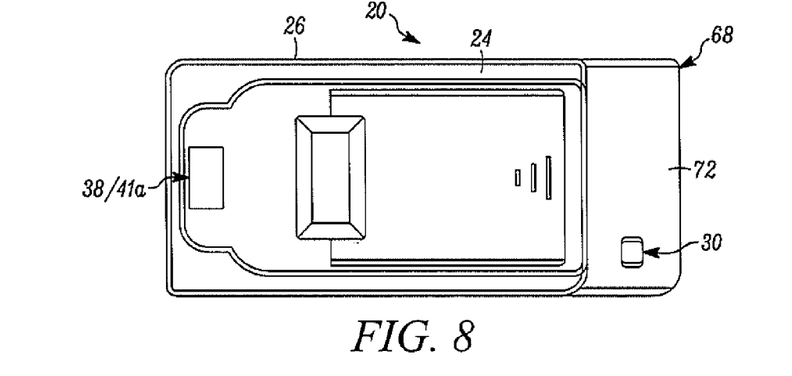
FIG. 8 shows a bottom view of the adapter system of FIG. 1 with the first adapter unit having a grip portion and the data capture device being a barcode scanner.
Figure 9:
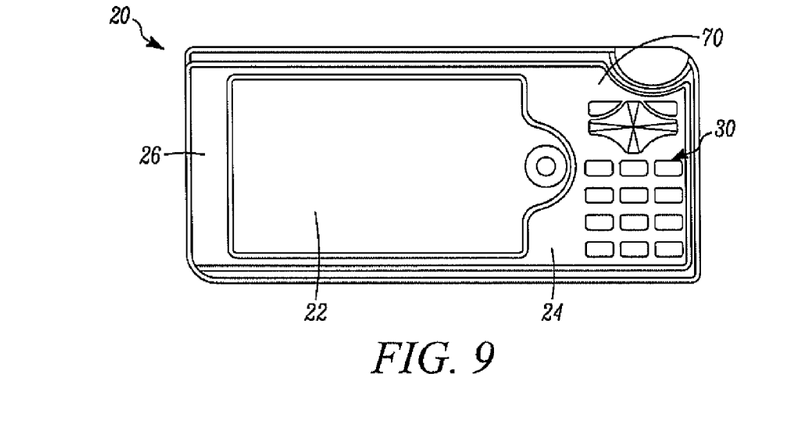
FIG. 9 shows a plan view of the adapter system of FIG. 8.
Figure 10:
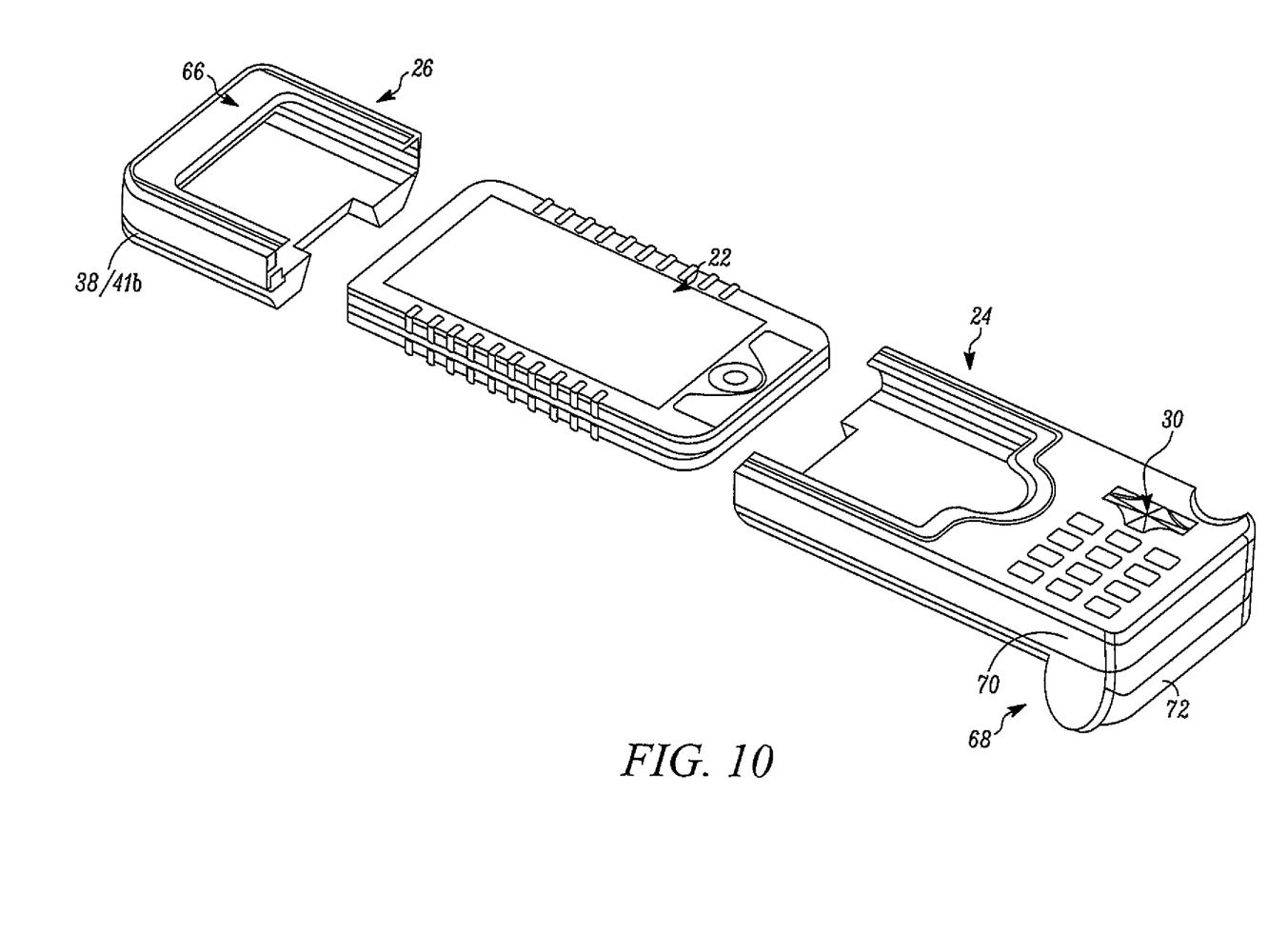
FIG. 10 shows an isometric view of the adapter system of FIG. 8 with the first adapter unit and the second adapter unit being decoupled from the PED and with the data capture device being a card reader.

Referring to FIGS. 8 to 10, the first adapter unit 24 further comprises a grip portion 68 formed adjacent the first adapter portion 28 and shaped for enabling one hand grip thereof by a user. Preferably, the at least one input actuator 30 and the grip portion 68 are inter-configured to enable gripping of the grip portion 68 and operation of the at least one input actuator 30 with one hand. Preferably, the input signals further at least one of provides data to and controls the PED 22.

The grip portion 68 comprises a body 70, whereon the first adapter portion 28 is supported, and a mound 72 protruding from the body 70 and shaped and dimensioned for wrapping of fingers of the user thereover. Preferably, the body 70 interposes the first adapter portion 28 and the mound 72. Preferably, the body 70 defines a concavity (not shown) along where the mound 72 protrudes for accommodating the fingertip of at least one of the fingers of the user when wrapped over the mound 72.

Preferably, the at least one input actuator 30 comprises a button and a scroll-wheel. Alternatively, the at least one input actuator 30 comprises at least one of a button, a scroll-wheel, a scroll-ball, a joy-stick and a touch-sensor (not shown). Preferably, the scroll-wheel is disposed adjacent the button. The mound 72 is preferably elongated with the button and the scroll-wheel being disposed at one extremity of thereof. Preferably, the button, the scroll-wheel and the mound 72 are inter-disposed for concurrent one-hand gripping of the grip portion 68, thumb-operation of the scroll-wheel and finger operation of the button.

Preferably, the body 70 comprises a first face and a second face outwardly opposing the first face. The at least one input actuator 30 further comprises a plurality of buttons 84 disposed on the first face of the body 70. Preferably, the mound 72 protrudes from the second face of the body 70. The body 70 further comprises a display 86 formed on the first face thereof. The display 86 is preferably a touch-screen for capturing user-input for conveyance to the PED 22.

Preferably, one or each of the first adapter unit 24 and the second adapter unit 26 comprises a compartment for accommodating a battery (not shown) for providing electrical power to at least one of the first adapter unit 24, the second adapter unit 26 and the PED 22.

Additionally, one or each of the first adapter unit 24 and the second adapter unit 26 further comprises at least one external connector whereto at least one of an external power source and an external device (both not shown) is connectable for provision of at least one of data signals and power thereto. The at least one external connector can, for example, provide a data link with the PED 22 without detachment of either the first adapter unit 24 and the second adapter unit 26 from the PED 22.

Preferably, one of the first adapter unit 24 and the second adapter unit 26 is adaptable and configurable for use without the other thereof. The first adapter unit 24 can further comprise one or both of an image capture device and a data capture device (both not shown). This enables the first adapter unit 24 to be coupled to for use with the PED 22, without the second adapter unit 26, for capturing of images via the image capture device or capturing of data by scanning a barcode using the data capture device.

The PED 22 preferably operates in either a device mode or an adapter mode. When either or both of the first adapter unit 24 and the second adapter unit 26 is coupled with the PED 22, the respective plurality of adapter contacts electrically couples with the corresponding plurality of device contacts to switch the PED 22 from the device mode to the adapter mode. The switch between the device mode and the adapter mode is preferably effected via provision of interrupts to one or both of software applications and firmware operating the PED 22. When the first adapter unit 24 and the second adapter 26 are decoupled from the PED 22, the PED 22 switches from the adapter mode back to the device mode. Preferably, the adapter mode has a plurality of sub-modes for catering to configurations of the PED 22 being coupled to the first adapter unit 24 only, the second adapter unit 26 only and both the first adapter unit 24 and the second adapter unit 26.

The adapter mode is preferably configurable for enabling one or any of the controlling of the data capture device 38 of the second adapter unit 26 by operating the at least one input actuator 30 of the first adapter unit 24 or the user interface 64 of the PED 22 and the controlling of the data capture device (not shown) of the first adapter unit 24 by the operating the at least one input actuator 30 of the first adapter unit 24 or the user interface 64 of the PED 22.

Preferably, the PED 22 further comprises at least one of a capture module 84 for capturing at least one of images and data. The data is captured, for example, from a barcode by scanning thereof using the capture module 84. In the adapter mode, the capture module is controllable by operating the at least one input actuator 30 of the first adapter unit 24 or the user interface 64 of the PED 22.

Each of the first adapter unit 24 and the second adapter unit 26 can add further functionality to the PED 22. For example, either or each of the first adapter unit 24 and the second adapter unit 26 can further comprise storage module for providing additional storage capacity to the PED 22, a biometric or fingerprint scanner, or a global positioning system (GPS) device (all not shown).

In the foregoing manner, an adapter system and an adapter unit for use with a portable electronic device is described according to one exemplary embodiment of the present invention. Although only one exemplary embodiment of the present invention is disclosed, it will be apparent to a person skilled in the art in view of this disclosure that numerous changes and/or modifications can be made without departing from the scope and spirit of the present invention.

What is claimed is:

1. An adapter system shaped for removably coupling with a portable electronic device, the adapter system comprising:
   a first adapter unit for removably coupling with the portable electronic device and having a grip portion shaped for enabling one hand grip thereof by a user the first adapter unit further comprising at least one input actuator operable for communicating input signals with the portable electronic device via the first adapter unit when coupled with the portable electronic device, the at least one input actuator and the grip portion being inter-configured to enable gripping of the grip portion and operation of the at least one input actuator with one hand; and
   a second adapter unit having at least one of an image capture device and a data capture device controllable by operating the at least one input actuator of the first adapter unit for generating data signals and communicating the data signals to the portable electronic device when the portable electronic device is coupled with the adapter system, the first adapter unit and the second adapter unit being inter-couplable for encasing the portable electronic device along the periphery of the portable electronic device such that both the first adapter unit and the second adapter unit comprise plurality of adapter contacts for engaging and communicating with a corresponding plurality of device contacts of the portable electronic device.

2. The adapter system as in claim 1, the adapter system comprising:
   at least one of an image capture device and a data capture device.

3. The adapter system as in claim 1, the grip portion comprising:
   a body whereon the first adapter unit is supported; and
   a mound protruding from the body and shaped and dimensioned for wrapping of fingers of the user thereover, the body interposing the first adapter unit and the mound.

4. The adapter system as in claim 3, the body comprising a display formed on a first face thereof.

5. The adapter system as in claim 3, the body defining a compartment for accommodating a battery for providing electrical power to at least one of the adapter system and the portable electronic device.

6. The adapter system as in claim 1, the at least one input actuator comprising at least one of a button, a scroll-wheel, a scroll-ball, a joy-stick and a touch-sensor.

7. The adapter system as in claim 1, further comprising at least one external connector whereto at least one of an external power source and an external device is connectable for provision of at least one of data signals and power thereto.

8. The adapter system as in claim 1, wherein the data capturing device comprises at least one of a barcode scanner, a card reader, a near-field transceiver for at least one of receiving and transmitting data from a transponder device, the barcode scanner transducing data signals from a scanned barcode for provision to the portable electronic device.

9. The adapter system as in claim 1, the portable electronic device comprising at least one of an image capture device and a barcode scanner controllable by operating the at least one input actuator.

10. An adapter system comprising:
    a first adapter unit comprising:
       a first adapter portion shaped for removably coupling with a portable electronic device, the first adapter portion being further arranged for electrically communicating with the portable electronic device when coupled therewith; and
       a grip portion shaped for enabling one hand grip thereof by a user; and
       at least one input actuator operable for communicating input signals with the portable electronic device via the first adapter portion, the at least one input actuator and the grip portion being inter-configured to enable gripping of the grip portion and operation of the at least one input actuator with one hand, and
    a second adapter unit wherewith the input signals from the at least one input actuator is further communicable, the second adapter unit comprising:
       a second adapter portion shaped for removably coupling with the portable electronic device; and
       at least one of an image capture device and a data capture device controllable by operating the at least one input actuator for generating data signals and communicating the data signals to the portable electronic device when the providable to the portable electronic device the first adapter unit and the second adapter unit being inter-couplable for encasing the portable electronic device at least along the periphery thereof such that both the first adapter unit and the second adapter unit comprise plurality of adapter contacts for engaging and communicating with corresponding plurality of device contacts of the portable electronic device.

11. The adapter system as in claim 10, the data capture device of the second adapter unit comprising:

at least one of a barcode scanner, a card reader, a near-field transceiver for at least one of receiving and transmitting data from a transponder device and an image capture device, the at least one of the barcode scanner, the card reader, the near-field transceiver, the barcode scanner transducing data signals from a scanned barcode for provision to the portable electronic device.

12. The adapter system as in claim 10, the at least one of the image capture device and the data capture device being formed on the second adapter unit.

13. The adapter system as in claim 10, the first adapter unit further comprising:

a grip portion formed adjacent the first adapter portion and shaped for enabling one hand grip thereof by a user, the at least one input actuator and the grip portion being inter-configured to enable gripping of the grip portion and operation of the at least one input actuator with one hand and the input signals being further for at least one of providing data to and controlling the portable electronic device.

14. The adapter system as in claim 13, the grip portion comprising:

a body whereon the first adapter portion is supported; and a mound protruding from the body and shaped and dimensioned for wrapping of fingers of the user thereover, the body interposing the first adapter portion and the mound.

15. The adapter system as in claim 14, the body comprising a display formed thereon.

16. The adapter system as in claim 10, the at least one input actuator comprising at least one of a button, a scroll-wheel, a scroll-ball, a joy-stick and a touch-sensor.

17. The adapter system as in claim 10, at least one of the first adapter unit and the second adapter further comprising a compartment for accommodating a battery for providing electrical power to at least one of the first adapter unit, the second adapter unit and the portable electronic device.

* * * * *